United States Patent
Legoupi et al.

(10) Patent No.: US 10,228,681 B2
(45) Date of Patent: Mar. 12, 2019

(54) METHOD OF GENERATING A MACHINING PROGRAM

(71) Applicant: SPRING TECHNOLOGIES, Montreuil (FR)

(72) Inventors: Philippe Legoupi, Champigny sur Marne (FR); Olivier Bellaton, Le Raincy (FR)

(73) Assignee: SPRING TECHNOLOGIES, Montreuil (FR)

( * ) Notice: Subject to any disclaimer, the term of this patent is extended or adjusted under 35 U.S.C. 154(b) by 213 days.

(21) Appl. No.: 15/065,401

(22) Filed: Mar. 9, 2016

(65) Prior Publication Data
US 2016/0266574 A1    Sep. 15, 2016

(30) Foreign Application Priority Data

Mar. 10, 2015   (FR) ...................................... 15 51995

(51) Int. Cl.
*G05B 19/40*    (2006.01)
*G05B 19/4155*    (2006.01)
*G05B 19/4069*    (2006.01)

(52) U.S. Cl.
CPC ..... *G05B 19/4155* (2013.01); *G05B 19/4069* (2013.01); *G05B 2219/36126* (2013.01)

(58) Field of Classification Search
CPC .......................... G05B 19/4155; G05B 19/4069
See application file for complete search history.

(56) References Cited

U.S. PATENT DOCUMENTS

| | | | | |
|---|---|---|---|---|
| 5,249,045 | A * | 9/1993 | Lemelson | B07C 5/10 348/92 |
| 9,523,979 | B2 * | 12/2016 | Hashizume | G05B 19/4063 |
| 9,772,302 | B2 * | 9/2017 | Zelin | G01N 27/4163 |
| 2012/0296462 | A1 * | 11/2012 | Otsuki | G05B 19/4069 700/104 |
| 2015/0039122 | A1 * | 2/2015 | Barakchi Fard | G06F 17/5009 700/186 |
| 2017/0277156 | A1 * | 9/2017 | Deguchi | G05B 19/0426 |
| 2017/0308057 | A1 * | 10/2017 | Kreidler | G05B 19/4069 |
| 2017/0308058 | A1 * | 10/2017 | Kreidler | G05B 19/4069 |
| 2017/0316323 | A1 * | 11/2017 | Nakanishi | G01B 21/28 |

FOREIGN PATENT DOCUMENTS

EP           1548529 A1    6/2005

* cited by examiner

*Primary Examiner* — Nicholas J Tobergte
(74) *Attorney, Agent, or Firm* — Muncy, Geissler, Olds & Lowe, P.C.

(57) ABSTRACT

A method of generating a machining program that can be interpreted by a physical controller of a numerical control machine tool. The machining program is generated from a prerecorded set of machine parameters representative of the machine tool, and a prerecorded set of machining sequences on the basis of at least some of the said machine parameters and of at least some of the machining sequences, a computer simulation program carries out machining feasibility tests (TST), the machining program being generated in a format that can be executed by the said physical controller only if it passes the machining feasibility tests beforehand.

10 Claims, 8 Drawing Sheets

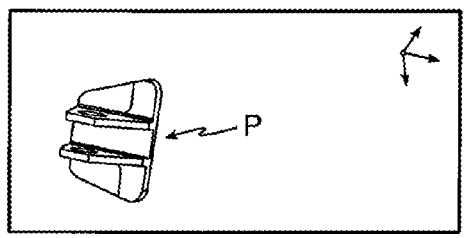
Preparation (setting-up)
Drawing office CAD component in its design frame of reference (aircraft zero, vehicle zero, etc.)
Fig. 3a
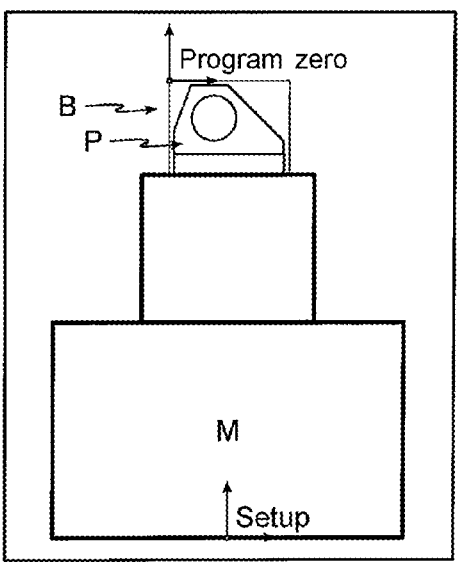
Assembly of the component, of the workpiece and of the clamping system to create a setup
The setup has its own design frame of reference: setup zero
Definition of a program zero frame of reference
Fig. 3b

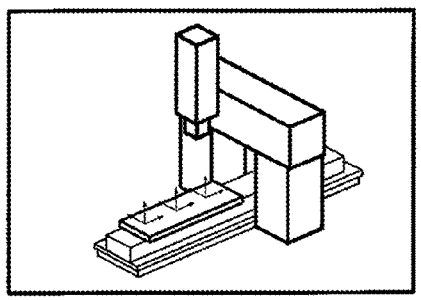

Setup placed on a bed of the machine
Tool mounted on the spindle

Calculating the generic ISO

1) Kinematic feasibility

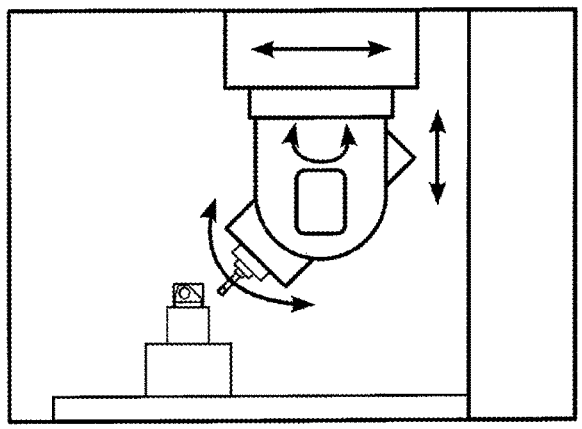

Calculate the position of the machine, conversion from a point X, Y, Z, vx, vy, vz expressed in the component frame of reference into a machine position X, Y, Z, A, B, C expressed in the program frame of reference.

If position impossible:
Stop processing

2) Physical feasibility

Check whether the calculated position can be achieved.
(No overtravel on the axes)

If position impossible:
Stop processing

Fig. 5

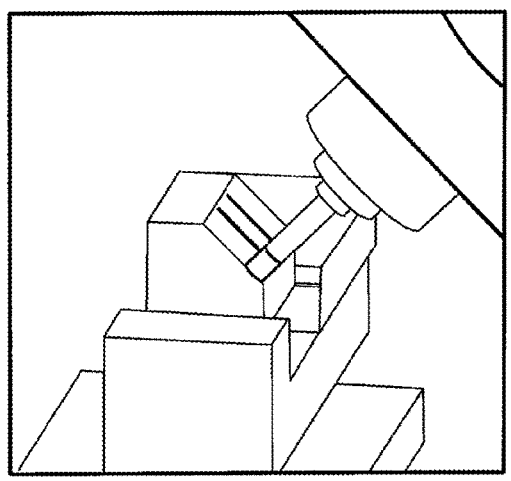
Checking typed ISO
1) Re-read the file in the typed ISO format
2) Simulate the removal of material in order to:
 · Check alerts (non-cutting part, attachment contact) and detection of collisions.
 · Update the volume of the workpiece ready for the next operation.
If no error:
Path valid
Fig. 8

METHOD OF GENERATING A MACHINING PROGRAM

BACKGROUND OF THE INVENTION

Patent document EP 1 548 529 for example discloses a numerical control machine tool.

A numerical control machine tool comprises:
several moving parts able to move relative to one another;
a plurality of actuators designed to bring about a relative movement of these moving parts;
one of these moving parts forms a tool holder able to bear an actual tool, also referred to as a machining tool;
another of these moving parts forms a support to hold means that hold in position an actual workpiece that is the starting point for a component that is to be machined, the machine tool forming a drive line extending between the tool holder and the moving part that forms the support for holding the means that hold in position the workpiece that is the starting point for the component that is to be machined;
a plurality of sensors for generating position data representative of a current position of the tool holder with respect to an actual machine frame of reference;
a physical controller able to interpret a machining program and, as a function of this interpretation, to command the plurality of actuators to move the tool holder with respect to the means of holding the actual workpiece in position in order thus to be able to move the actual tool borne by the tool holder with respect to the actual workpiece and thus machine this actual workpiece as a function of instructions contained in the machining program.

The ability to generate a faultless machining program is absolutely essential to the ability to machine a component that conforms to a drawing.

Traditionally, the machining program has been generated by following a complex process illustrated in FIG. 1 and comprising the following series of steps.

In step 1, using computer aided design software, a file is generated that is a three-dimensional model of the component that is to be machined.

In step 2, this file that models the component is transferred to a computer aided manufacturing software package and a first virtual tool is chosen that the operator considers suitable for machining at least a first of the geometric entities of the component modelled in the file. For example, if the operator wishes to drill a hole, the virtual tool will be a drill bit with a given virtual length and a given virtual diameter; if he wishes to perform surfacing, the virtual tool is a milling cutter; if he wishes to create a part exhibiting symmetry of revolution, the virtual tool will be a turning tool.

In step 3, the operator delimits geometric entities of the modelled component that is to be produced and associates with each geometric entity a machining strategy which may be a strategy of drilling, surfacing, turning or the like. Each machining strategy is associated with a virtual tool which has been chosen in step 2 and with operating conditions in which the virtual tool is to be used so that it can correctly cut away the material of the workpiece being machined (maximum cutting rate, maximum depth of pass, maximum feed rate, etc.).

In step 4, in accordance with the machining strategy prepared in step 3 which comprises a virtual tool chosen in step 2, the computer aided manufacturing software determines a first virtual path of the virtual tool. This first path of the virtual tool is such that the virtual tool can, by following this first path, machine the geometric entity delimited by the user in step 3.

In step 5, still using the computer aided manufacturing software, the user repeats steps 2 to 4 to define a set of virtual paths for all the virtual tools needed for the virtual machining of all the geometric entities that define the shapes of the component that is to be machined (one shape of the component that is to be machined may be made up of several geometric entities).

In step 6, the user makes a three-dimensional simulation of the removal of material resulting from all of the virtual paths of virtual tools defined in steps 2 to 5. The result of this simulation is a simulated form representing the virtual workpiece machined by the movement of the virtual tools along their respective virtual paths. If the deviation between this form simulated using the computer aided manufacturing software and the component modelled using the computer aided design software is acceptable, namely within the defined tolerances for the component modelled, then he manually commands the computer aided manufacturing software to generate a file summarizing a set of validated virtual paths and validated virtual tools, then moves on to step 7. If not, it is possible either to redesign the component by repeating the process from step 1 to step 6 until there is an acceptable deviation between the simulated form and the modelled component so that the summary file can be generated allowing progression to step 7. The user can also decide to modify the process by modifying at least some of the choices made in steps 2 to 6. For example, he may modify the choices of virtual tools and/or of geometric entities and/or of machining strategies and/or of virtual paths. The operator modifies these choices and runs as many simulations of simulated forms as necessary until the deviation between the simulated form and the modelled component is considered to be acceptable, whereupon the user then generates the summary file and moves on to step 7.

In step 7, the user transfers the file summarizing the set of validated virtual paths and virtual tools to a post processor which is programmed to determine link paths intended to join together the virtual paths of the set of virtual paths that succeed one another. From these link paths and from the virtual paths needed to generate the simulated form of the virtual component, the post processor generates a machining program in the form of a text file that is supposedly directly interpretable by the physical controller of the target machine tool on which the workpiece that is the starting point for the component is to be machined.

In step 8, the machining program supposedly interpretable by the physical controller of the machine tool is recorded and, as described previously, can then be sent to the machine tool where it can be interpreted and executed in slow-time and tested on the actual machine tool. If the machining program is incorrect, there is a risk that the physical controller will interpret it and command the actuators to perform movements which may lead to non-compliant machining of the actual workpiece and/or breakage of the machine tool, for example by the actual tool or tool holder colliding with one of the moving parts of the machine or with the means that hold the actual workpiece. Executing the machining program in slow-time with actual workpiece holding means empty of any actual workpiece or carrying a low-cost dummy actual workpiece allows the operator to detect machining defects and then interrupt this machining and then correct the machining program. The corrected machining program may in turn be executed in slow-time. This iterative process of detecting machining faults is expensive to implement.

In step 9, as an alternative to the test on an actual machine tool as mentioned in step 8, the machining program supposedly interpretable by the physical controller of the machine tool is sent to a virtual machine tool that simulates the actual operation of the target machine tool on which the workpiece that forms the starting point for the component is to be machined. A virtual controller of the virtual machine tool which simulates the operation of the physical controller of the target machine tool is then activated to interpret the supposedly interpretable machining program. If this interpretation works, the process then moves on to step 10 of executing the machining program on the virtual machine tool comprising a virtual controller. If the interpretation fails, the operator then needs to identify the supposed reason for this interpretation failure and go back and correct parameters in one of the preceding steps 7 to 8. He may, for example, change the version of post processor if he considers it not to be compatible with the virtual machine, or alternatively he may change the version of virtual machine or of virtual controller.

In step 10, the operator executes the machining program interpreted by the virtual controller of the virtual machine tool and, using a three-dimensional representation, visualizes a virtual machining on this virtual machine tool conforming to the machining program interpreted by the virtual controller. This visualization allows the operator to detect virtual machining faults which he wishes not to encounter again during the actual machining. For each fault found during the virtual machining, the operator looks for a potential cause of the fault then repeats at least some of steps 1 to 9 of the process, modifying the parameters that he considers to be responsible for the failure to execute the virtual machining.

This process spanning steps 1 to 10 requires a great deal of software (computer aided design software, computer aided manufacturing software, post processor, software simulating the operation of a machine tool in response to the execution of a machining program, etc.) and numerous types of files in different formats and languages for the exchange of data between these software packages. The complexity of this process makes it very difficult to generate a machining program that can be interpreted and executed by an actual machine tool and that makes it possible to obtain a compliant machined component while at the same time minimizing the risk of breaking the machine or breaking the tool.

SUBJECT OF THE INVENTION

One object of the present invention is to provide a method of generating a machining program that can be interpreted by a physical controller of a numerical control machine tool.

SUMMARY OF THE INVENTION

To this end, the invention proposes a method of generating a machining program that can be interpreted by a physical controller of a numerical control machine tool, this machine tool comprising several moving parts able to move relative to one another so as to move an actual tool with respect to an actual workpiece that is the starting point for the component that is to be machined, the actual tool being borne by one of the moving parts of the machine and the actual workpiece being borne by another of the moving parts of the machine via means for holding the actual workpiece in position, the method of generating a machining program according to the invention being essentially characterized in that the machining program is generated from:

a prerecorded set of machine parameters representative of the machine tool, some of these machine parameters being representative of space volumes each space volume being representative of at least one of the said moving parts of the machine tool and other machine parameters being representative of kinematic links between at least some of the said moving parts of the machine; and a prerecorded set of machining sequences, each machining sequence being representative of an expected movement of the actual tool during part of the machining of a component;

the method of generating the machining program being further characterized in that on the basis of at least some of the said machine parameters and of at least some of the machining sequences, a computer simulation program carries out machining feasibility tests, the machining program being generated in a format that can be executed by the said physical controller only if it passes the machining feasibility tests beforehand.

The machining feasibility tests are carried out by a computer simulation program using:

the machining sequences for determining a simulated expected route of the machining tool throughout the machining;

the machine parameters which represent the space volumes of the moving parts of the machine; and the machine parameters which represent the kinematic links between these moving parts.

The simulated expected route of the machining tool represents the expected movement of the actual machining tool moved in accordance with these machining sequences.

In the knowledge that one of the parts of the machine tool forms a tool holder and that another of the parts of the machine tool bears means for holding an actual workpiece that forms the starting point for the component that is to be machined, and knowing the kinematic links between the moving parts of the machine, the computer simulation program simulates the movements of the space volumes representative of the moving parts of the machine tool which are needed for moving the machining tool along these machining sequences, namely along the simulated expected route of the actual machining tool, allowing the component to be machined.

According to predetermined testing rules, the computer simulation program checks whether the machining feasibility tests are passed. In the event of a pass, this computer simulation program allows the generation of the machining program in a format executable by the said physical controller. If at least one of these machining feasibility tests is failed, the computer simulation program prevents the generation of the said machining program in the format executable by the physical controller.

In response to the authorization generated by the computer simulation program carrying out the feasibility tests, at least one first writing algorithm generates a machining preprogram in a generic format then this machining preprogram in the generic format is rewritten in the form of a machining preprogram in the format executable by the physical controller. If this machining preprogram is considered to be correct in the syntax specific to the format executable by the physical controller then this machining preprogram in the executable format is recorded to be considered to form the machining program in the format executable by the physical controller.

In general, the machining program in the format executable by the physical controller is almost generated as a function of the prerecorded set of machine parameters and of the prerecorded set of machining sequences.

In the preferred embodiment of the invention which goes through the machining preprogram phases, it is the machining preprogram in the generic format which is generated as a function of the prerecorded set of machine parameters and as a function of the prerecorded set of machining sequences. The preprogram in the executable format and the machining program in the executable format are therefore also generated as a function of the prerecorded set of machine parameters and of the prerecorded set of machining sequences.

BRIEF DESCRIPTION OF THE DRAWINGS

Further features and advantages of the invention will become clearly apparent from the description thereof given hereinafter by way of entirely nonlimiting indication with reference to the attached drawings in which:

FIGS. 3a and 3b illustrate the operation of setting up a virtual model of a component and a virtual model of a workpiece on means of holding in position the actual workpiece mentioned in FIG. 2;

FIG. 5 illustrates the integration of the model representative of the actual tool and of the virtual model representative of the component that is to be machined in the machine environment so as to carry out machining feasibility tests which are carried out prior to the generation of the machining program executable by the physical controller;

FIG. 8 illustrates a test on the syntactic validity of the preprograms in generic format and executable format so as to permit or otherwise the generation of the machining program that is validated, can be interpreted and executed by the target physical controller, the defined path being considered to be valid.

DETAILED DESCRIPTION OF THE INVENTION

In general, in the present application:
the abbreviation NC denotes the term numerical control machine tool;
the term generic ISO denotes the machining preprogram in the generic format;
the term typed ISO denotes the machining preprogram in the format executable by the physical controller.

Figure 2:
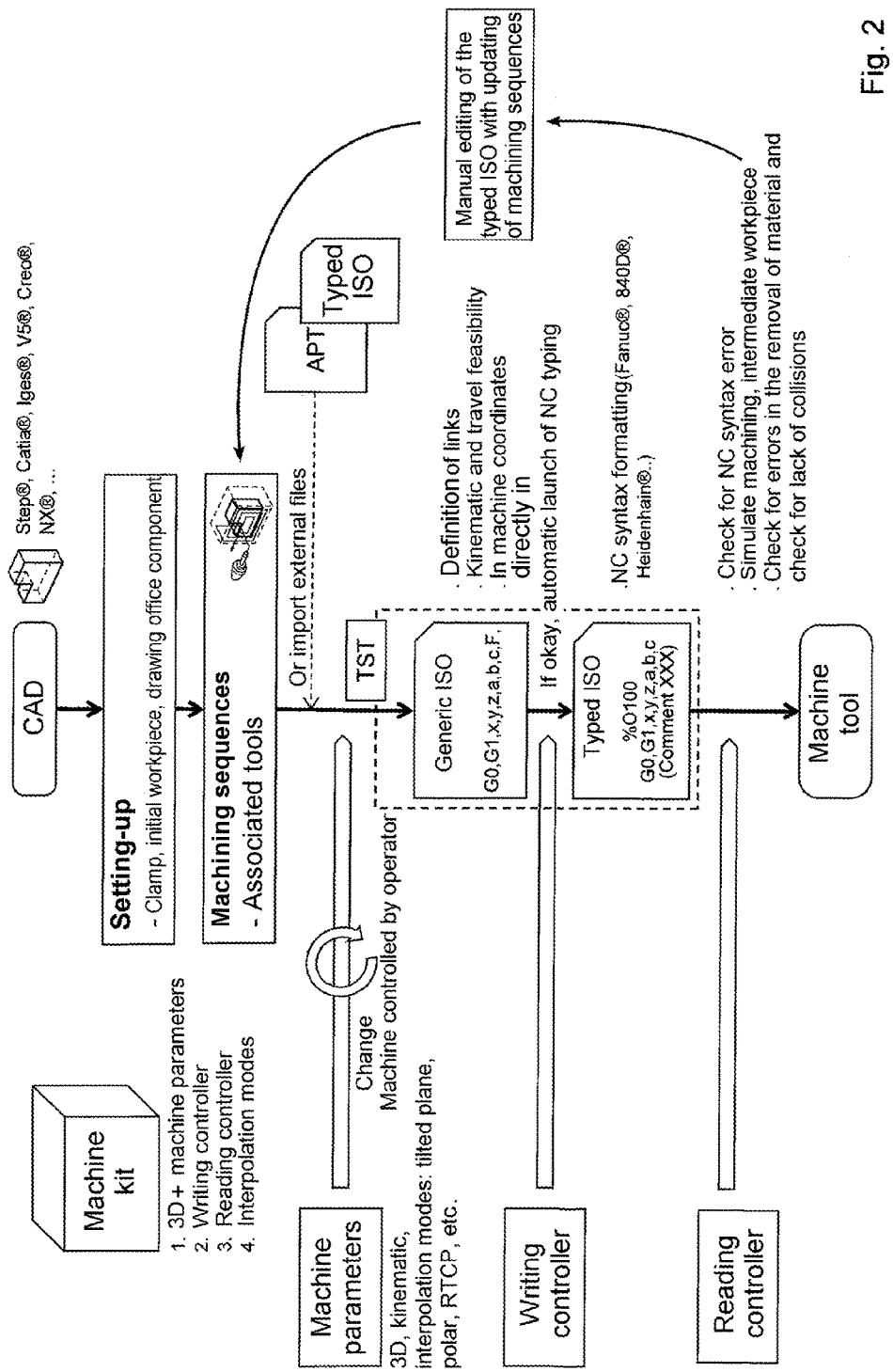
FIG. 2 shows the method of generating the program according to the invention in its entirety, FIGS. 3a to 8 illustrating parts of this method according to the invention.

The setting-up operation set out in FIG. 2 is detailed via FIGS. 3a and 3b. This setting-up operation consists in positioning the model of a component that is to be machined (visible in FIG. 3a with its own frame of reference) as determined by the drawing office using the computer aided design software with respect to a space volume representing means of holding the actual workpiece in position and with respect to a space volume representative of a moving part of the target machine tool, namely of the machine tool on which this component is to be machined to conform to the model determined by the design software (visible in FIG. 3b).

During this so-called setting-up operation, use is made of a setup, namely of a virtual relative fixing of the space volume representative of the component that is to be machined with respect to the means for holding the actual workpiece in position.

This setup/virtual assembly of the model of a component with the model of the workpiece positioning means is recorded with its own frame of reference.

This recording also illustrates a model representative of the initial workpiece that is to be machined in order to form the component and the expected machined component as well as the positioning means, namely the clamps used to hold the workpiece prior to machining and to hold the component that it becomes at the end of machining.

As can be seen in FIG. 2, this recording represents a virtual assembly of use in determining the machining sequences required in order to pass, using the associated machining tool, from the workpiece to the final machined component.

Having delimited geometric entities of the modelled component that is to be produced, the operator chooses the virtual machining tool representative of an actual machining tool, this virtual tool being intended to simulate a machining of at least one geometric entity of the modelled component.

Figure 4:
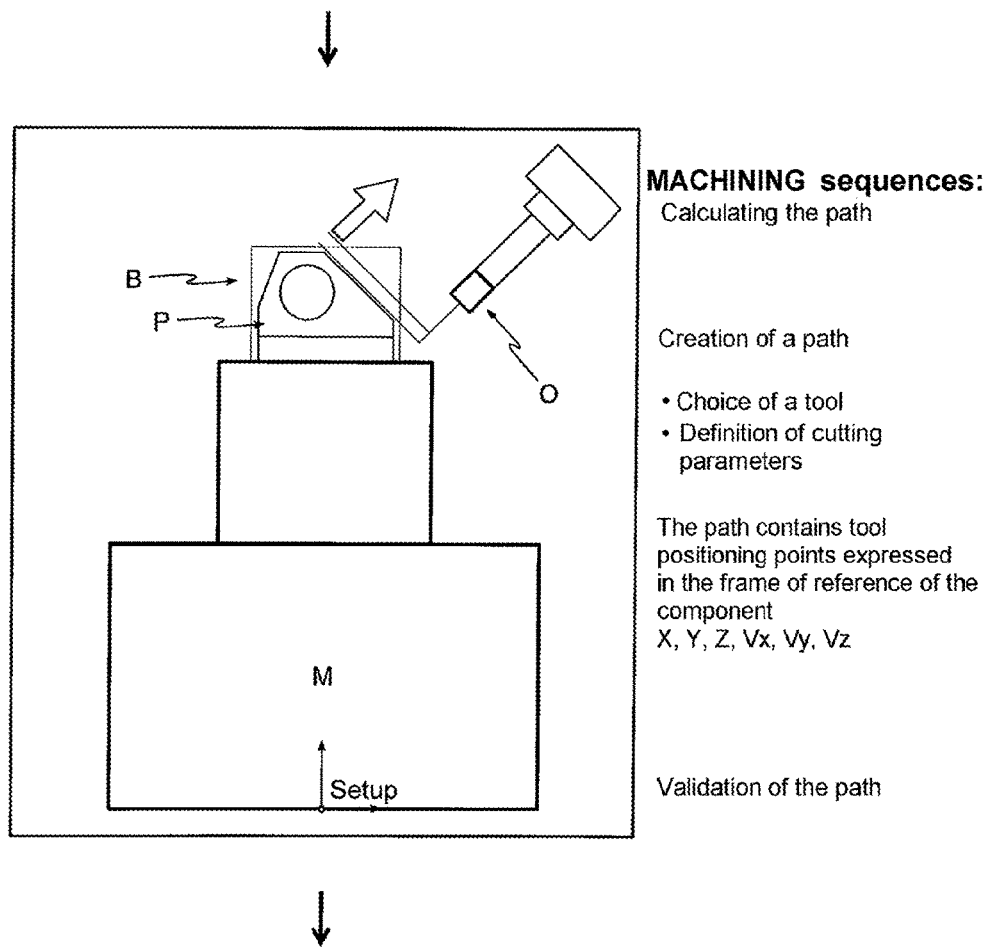
FIG. 4 illustrates the operation of generating the machining sequences from the tool, from the model of the component that is to be obtained and from machining strategies defining characteristics of the tool and cutting parameters specific to it.
Figure 6:
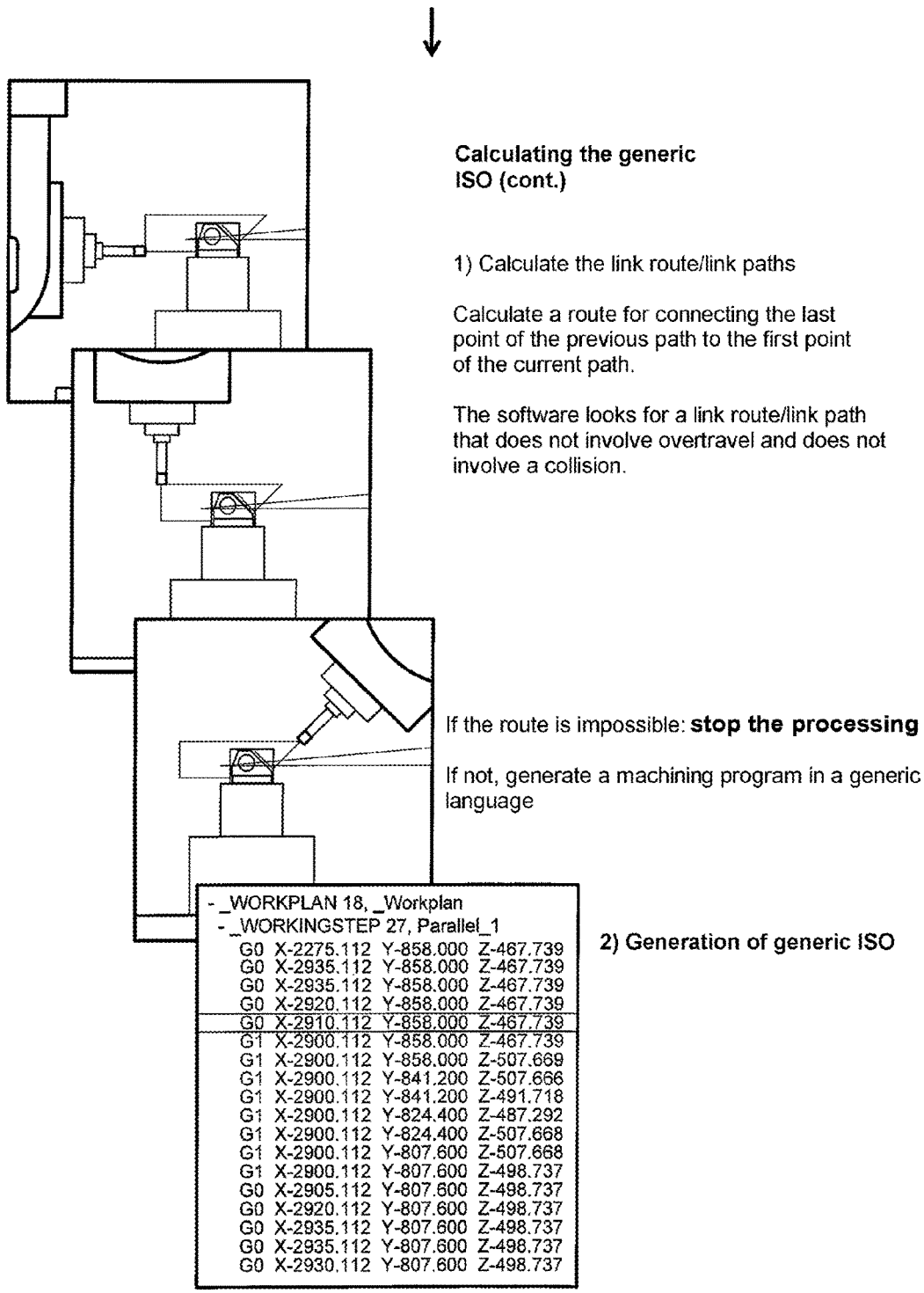
FIG. 6 illustrates the calculation of the link paths and a kinematic feasibility test on the simulated expected route of the tool during the course of machining. It may be seen from this FIG. 6 that if the feasibility tests are passed, a preprogram is generated in generic ISO code, not specific to the format executable by the target physical controller.
Figure 7:
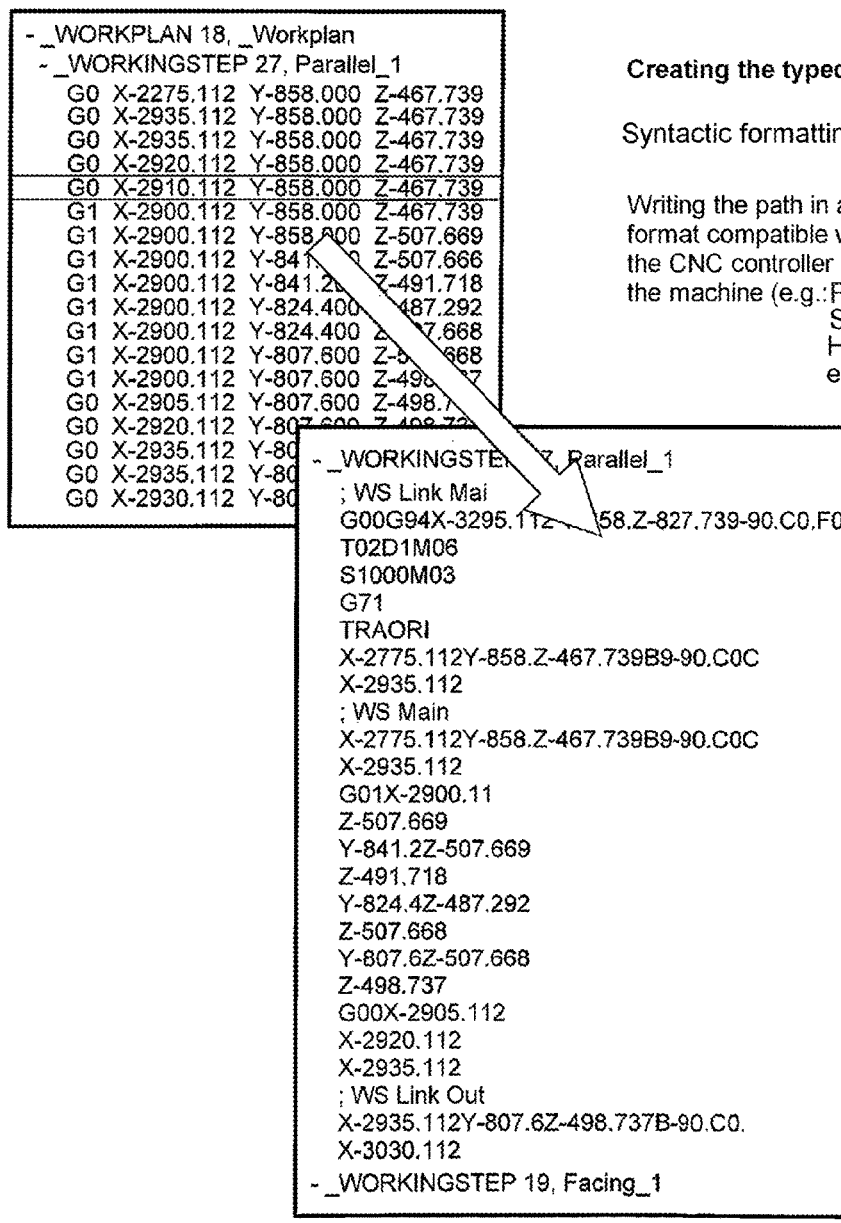
FIG. 7 illustrates the generation of the machining program in the executable format from the preprogram in the generic format.

The space volume representative of the actual machining tool chosen for the machining is depicted in FIG. 4, with the space volumes representative of the workpiece that is to be machined B, of the machined component P and of the holding means M that hold it in position.

Figure 1:
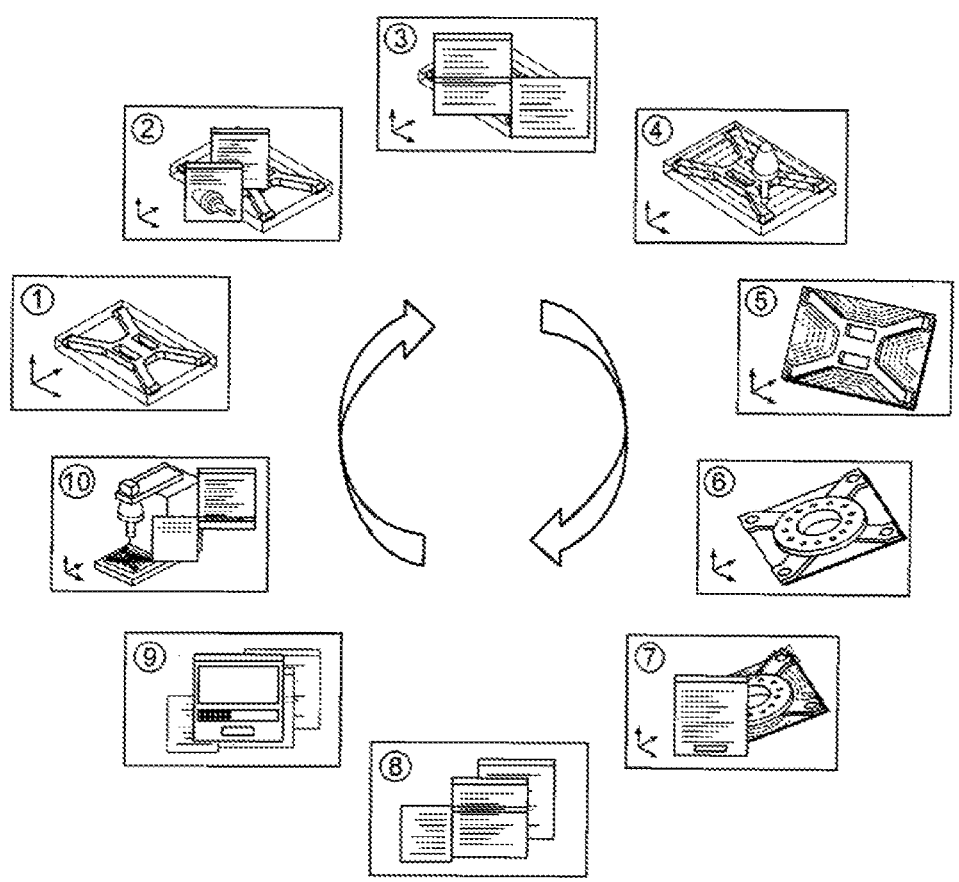
FIG. 1 depicts a method of generating a machining program according to the prior art.

As was already indicated with reference to FIG. 1, the operator associates a machining strategy, drilling, surfacing, turning or the like, with each geometric entity of the component. Each machining strategy is associated with a virtual tool and with operating conditions in which the virtual tool is to be used in order to cut the material of the machined workpiece correctly (maximum cutting rate, maximum depth of pass, maximum feed rate, etc.).

Using this information a machining sequence breakdown algorithm generates a set of machining sequences for machining the component using the said at least one tool.

These machining sequences form a prerecorded set of machining sequences, each machining sequence being representative of an expected movement of the actual tool during the course of part of the machining of a component. As will be appreciated from FIG. 4, each machining sequence determines an expected movement of the tool which is determined as a function of the machining/cutting tool chosen and as a function of the associated cutting parameters. Each expected movement of the tool is expressed in the form of tool positioning points expressed in the frame of reference of the component X, Y, Z, Vx, Vy, Vz. The operator can visualize the expected movement of the tool during the machining sequence.

As can be seen in FIG. 2, the machining sequences may be generated automatically by the machining sequence generation algorithm using a machining program executable by a physical controller. This is advantageous for example if the machining sequences which correspond to a machining program executed by a physical controller of a workshop machine have become lost. All that is required is for the operator to manually edit the typed ISO operating on the machine tool and to transmit this machining program to the machining sequence generation algorithm. From this algorithm, knowing the parameters/exact forms of the actual tool, each of the machining sequences and even the link paths used by the machine tool to join the machining sequences together can be redefined.

Once the machining sequences have been calculated, these are recorded to form a prerecorded set of machining sequences.

During the next step, link paths are calculated, each link path being representative of an expected movement of the actual tool between two of the said machining sequences that immediately succeed one another.

By definition:
a machining sequence is a sequence defining an expected path of the actual tool and comprises an expected path along which the actual tool penetrates the material of the workpiece, an expected cutting path in which the actual tool is in contact with the workpiece to remove material therefrom, and an expected path along which the actual tool leaves the material of the workpiece. It should be noted that the entry and exit paths define entry and exit conditions of the tool.

A link path is an expected path of the actual tool in which the actual tool needs to be moved only some distance away from the workpiece, without touching it, the link path connecting two expected paths of the actual tool which are respectively defined by two machining sequences that immediately succeed one another. What is meant by two machining sequences that immediately succeed one another is that there is no other machining sequence using the said actual tool placed between them.

Each link path linking two machining sequences that immediately succeed one another is calculated by a link path calculating algorithm executed by a processor:
as a function of a first expected position of the actual tool at the end of the first of these two machining sequences that immediately succeed one another; and
as a function of a second expected position of the tool at the start of the second of these two machining sequences that immediately succeed one another.

Then, from the machining sequences and from the link paths, a simulated expected route of the tool throughout the machining is generated.

Knowing this simulated expected route of the tool throughout the machining it is then possible, via a simulation set out in FIG. 5, to represent the movements of the moving parts of the machine which are necessary to allow the virtual tool to move in relation to the workpiece that is to be machined.

For this, a virtual connection is made, on the one hand, between the virtual tool representative of the actual tool and a moving part of the machine acting as the tool holder and, on the other hand, between the means that hold the actual workpiece in position and another moving part of the machine supporting these holding means. In this particular instance, the holding means form a machining fixture fixed to a moving part of the machine which forms the bed.

Having connected the tool and the workpiece to the moving parts of the machine, it is then easy to deduce the movements of these moving parts that are needed for the tool to be able to follow the simulated expected route of the tool throughout the machining.

For this, use will now be made of the machine parameters given hereinafter.

As can be seen in FIG. 2, the target machine tool that is to be used to carry out the machining is known and represented via a prerecorded set of machine parameters representative of the machine tool.

These machine parameters include:
a set of "3D" files, each "3D" file being representative of space volumes each representative of at least one of the said moving parts of the machine tool,
a set of "kinematics" data representative of kinematic links between at least some of the said moving parts of the machine;
a writing control algorithm which will be discussed hereinafter;
a reading control algorithm which will be discussed hereinafter;
a set of "interpolation mode" data representative of the various interpolation modes executable by the machine tool described in the "machine kit".

It should be noted that an interpolation mode is a calculation rule that the physical controller of the machine tool has to apply in order to coordinate the movements of the moving parts so as to move the actual tool carried by the tool holder between two points. The interpolation modes may for example be the "tilted plane" mode as described in ISO standard 6983 in which the tilted plane mode is referred to as "tilted plane working" or the RTCP mode, it being possible for example for these modes to call for coordinates options such as polar coordinates or Cartesian coordinates. It should be noted that the RTCP, which stands for "Rotation Tool Centre Point", mode can be applied to machine tools equipped with a bi-rotary head or table kinematics. This function makes it possible to program the kinematic interactions between the moving parts of the machine with direct reference to the centre of the tool rather than the centre of rotation of axes of the machine kinematics. The RTCP interpolation mode also makes it possible to compensate for the length of the tool in space.

By using the machine parameters from the machine kit of the target machine it is possible to calculate the relative movements of a set of space volumes comprising the space volumes representative of the machine tool, a space volume representative of the tool holder, a space volume representative of the actual tool held by the tool holder, a space volume representative of the means that hold the actual workpiece in position.

This calculation of the relative movements of the set of space volumes is carried out on the basis of the simulated expected route of the tool throughout the machining, of the kinematic links between the said moving parts of the machine and on the basis of an expected positioning of the means for holding the actual workpiece in position on the moving part of the machine bearing the means for holding the actual workpiece in position.

As indicated previously, the method of generating a machining program interpretable and executable by the physical controller of the target machine uses a computer simulation program in order to carry out, preferably in an automated manner, machining feasibility tests TST illustrated in FIG. 2. The machining program is generated in the format executable by the said physical controller only if it passes the machining feasibility tests beforehand.

One of these machining feasibility tests is illustrated in FIG. 5. This test is a test on the kinematic feasibility of the machining involving checking, as a function of the prerecorded set of machine parameters and as a function of the prerecorded set of machining sequences, that the machine tool is capable of moving the actual tool in accordance with each of the machining sequences and in accordance with link paths.

In order to carry out this test, as indicated beforehand, the movements of the moving parts of the machine that are needed for the tool to be able to follow the simulated expected route throughout the machining are calculated. Since each part of the machine is represented by its space volume, it is easy to check whether, during the course of the relative movements of the set of space volumes, there are found to be collisions between some of the space volumes of this set.

In the event of there being such collisions, the kinematic feasibility test TST is considered not to have been passed, which means to say that the kinematic feasibility test is considered to have been failed and the computer simulation program then prevents the generation of the machining program in the executable format.

This test for example prevents the tool from coming into contact with the means that hold the actual workpiece in position, which would carry the risk of breaking the machine tool, the actual tool or the machining fixture that forms the means for holding the workpiece in position. By looking for machining errors before generating the machining program in the executable format, calculation time and also data processing time is saved.

For this reason, and also because it reduces the risks of machine/tool breakages, the method according to the invention offers a certain financial benefit. If there is found to be no collision between the space volumes of the set of space volumes then the kinematic feasibility test is considered to have been passed.

Among the machining feasibility tests TST carried out to condition the generation of the machining program in the executable format, there may for example be an expected machining quality test involving:

a) determining a deviation between:
an expected model of the machined workpiece B which is determined by carrying out a simulation of the removal of material from the workpiece by the tool moving along the simulated expected route of the tool O throughout the machining; and
a model of a component P that is to be machined, which model is generated using computer aided design CAD software; then b) if the deviation thus determined is greater than a predetermined authorized maximum deviation then a deviation analysis algorithm generates an alert that one of the machining feasibility tests TST, in this instance the expected machining quality test, has been failed, and if not, the deviation analysis algorithm generates a signal that this expected machining quality test has been passed.

Among the machining feasibility tests TST carried out in order to condition the generation of the machining program in the executable format, it is also possible to have a test of protecting the machining tool/cutting tool and involving generating, from the machining sequences and from the link paths, a simulated expected route of the tool throughout the machining with respect to the workpiece and then in ensuring:

that the simulated expected route of the actual tool is such that the actual tool moving through the workpiece cannot move at a speed higher than a predetermined limit speed; and/or that the actual tool moved along the simulated expected route is always moved in such a way as to machine the workpiece only using cutting edges; then if one of these conditions is failed, the computer simulation program prevents the generation of the machining program in the format executable by the said physical controller.

Among the machining feasibility tests TST carried out to condition the generation of the machining program in the executable format, it is also possible to carry out a test on the physical feasibility of the machining. On the basis of each expected movement of an actual tool during part of the machining of a component, extreme positions through which the actual tool needs to pass in order to perform the machining are calculated and the test on the physical feasibility of the machining consists in checking whether the machine tool is capable of moving the actual tool in such a way that it can achieve each of the calculated extreme positions.

This then avoids checks that the machine has enough travel to move the tool along the route necessary for machining the component. This method also makes it possible to avoid there being axes of mobility of the machine that reach their end-of-travel stops during the execution of the program by the machine tool. As can be seen in FIG. 5, this physical feasibility test makes it possible to check whether each calculated tool position X, Y, Z, Vx, Vy, Vz expressed in the component frame of reference can be achieved in the frame of reference X, Y, Z, A, B, C specific to the machining program.

If one of the machining feasibility tests TST is failed, the simulation program prevents the generation of the machining program and potentially proposes corrective action.

Typically, if machining feasibility tests have failed, this simulation program generates an alert.

This generated alert is preferably associated with an alert message selected from a predetermined list of alert messages, the alert message selected indicating an assumed reason for the failure of the machining feasibility tests.

The alert message is displayed for the benefit of an operator of the computer simulation program via a man-machine interface such as a screen. Depending on the alert message selected and displayed, the operator may redefine the machining sequences or shapes of the component or dimensions or positions of means for holding the actual workpiece that forms the starting point for the component that is to be machined. In some instances, the operator may also redefine the link paths between the machining sequences or even decide to change machine tool in order to choose one that has a wider range of movement, namely kinematic links between the constituent moving parts of the machine tool that are such that they are able to move the actual tool along the simulated expected course of the tool throughout the machining without there being any collision between the space volumes representative of the parts of the machine. It may be noted that, in this simulation, the means that hold in position an actual workpiece that forms the starting point of the component that is to be machined are represented by at least one of the said space volumes and that the tool holder is represented by another of the said space volumes.

By contrast, if all the feasibility tests TST are passed, the computer simulation program commands the generation of the machining program in the format executable by the said physical controller. This generation involves:

writing, using a first writing algorithm, a machining preprogram in a generic format distinct from the said format executable by the said physical controller; then checking, by a writing controller algorithm, the machining preprogram in the generic format, this writing controller algorithm checking whether this machining preprogram in the generic format conforms to predetermined linguistic rules specific to the generic format; then if the writing controller algorithm confirms that the machining preprogram in the generic format conforms to the predetermined linguistic rules specific to the generic format then this machining preprogram in the generic format is stored in memory so that it can be kept and a second writing algorithm rewrites this machining preprogram in the format executable by the said physical controller; then checking, by a reading controller algorithm, the machining preprogram in the format executable by the said physical controller, this reading controller algorithm checking whether this machining preprogram in the format executable by the said physical controller conforms to predetermined linguistic rules specific to the format executable by the said physical controller; then if the reading controller algorithm confirms that the machining preprogram in the format executable by the said physical controller conforms to the predetermined linguistic rules specific to the format executable by the said physical controller, then this machining preprogram in the format executable by the physical controller is considered to be the machining program generated in the format executable by the said physical controller, this latter program then being recorded so that it can be transmitted to the machine tool to be interpreted and executed by the physical controller thereof.

The predetermined linguistic rules specific to the generic format include syntax rules specific to the generic format and vocabulary rules specific to the generic format.

The predetermined linguistic rules specific to the format executable by the physical controller comprise syntax rules specific to the format executable by the physical controller of the target machine tool and vocabulary rules specific to this format executable by the physical controller.

Generating and storing a machining preprogram in the generic format which is distinct from the format executable by the physical controller makes it possible to keep an intermediate version of the machining program that can be reused if there is a desire to change target machine tool. Specifically, if there is a change in target machine tool then a machining program specifically suited to being executable by the physical controller of this new target machine needs to be generated. Since there is a version available in a generic format not specific to a single type of physical controller, the machining program can simply be rewritten in the new format executable by the new physical controller using only the machining program in the generic format as stored and a second writing algorithm suited to rewriting this machining preprogram stored in generic format in the new format executable by the new physical controller. This is of particular use in making it easier to adapt the machining program of one machine tool for another machine tool without the need to rework all of the machining sequences.

The benefit of using, on the one hand, a writing controller algorithm using predetermined linguistic rules specific to the generic format and, on the other hand, a reading controller algorithm using predetermined linguistic rules specific to the format executable by the physical controller of the target machine tool makes it possible to limit the risk of errors in the executable program transmitted to the controller of the machine tool. Specifically, the generic format is used whatever the target executable format of the target physical controller. That means that the syntax of the machining program can be tested for a first time while it is in the form of a preprogram in the generic format and the syntax of this machining program can be tested for a second time when it is in an alternative form, namely in the form of a preprogram in the format executable by a target physical controller.

The invention offers the operators in charge of generating the machining program options to convert a machining program for one workshop machine to suit others having mutually different physical controllers.

One advantage of the invention is that it allows the generation of machining programs for multiple machine tools each having their own physical controller.

Another advantage of the invention is that it allows this program to be generated from multiple data expressed in different formats, making the method extremely adaptable to particular industrial contexts.

For example, the prerecorded set of machining sequences may comprise:

machining sequences expressed in the form of a numerical control machine tool program in G code; or machining sequences originating from computer aided manufacturing software; or machining sequences expressed in the form of machining tool paths; or a combination of G-code machining sequences, sequences originating from computer aided manufacturing software and sequences expressed in the form of machining tool paths.

A program in G code means a numerical control machine tool program in accordance with ISO standard 6983.

Machining sequences originating from computer aided manufacturing software may be understood as meaning sequences in a neutral format of type .cl or .apt.

The invention claimed is:

1. A method of generating a machining program that can be interpreted by a physical controller of a numerical control machine tool, this machine tool comprising several moving parts able to move relative to one another so as to move an actual tool with respect to an actual workpiece that is the starting point for a component that is to be machined, the actual tool being borne by one of the moving parts and the actual workpiece by another of the moving parts via means for holding the actual workpiece in position, the method of generating a machining program being essentially characterized in that the machining program is generated from:

a prerecorded set of machine parameters representative of the machine tool, some of these machine parameters being representative of space volumes each one representative of at least one of the said moving parts of the machine tool and other machine parameters being representative of kinematic links between at least some of the said moving parts of the machine; and a prerecorded set of machining sequences, each machining sequence being representative of an expected movement of the actual tool during part of the machining of a component;

wherein, on the basis of at least some of the said machine parameters and of at least some of the machining sequences, a computer simulation program carries out machining feasibility tests (TST), the machining program being generated in a format that can be executed by the said physical controller only if it passes the machining feasibility tests beforehand; and wherein said generation of the machining program in the format executable by the said physical controller involves:

writing, using a first writing algorithm, a machining preprogram in a generic format distinct from the said format executable by the said physical controller; then checking, by a writing controller algorithm, the machining preprogram in the generic format, this writing controller algorithm checking whether this machining preprogram in the generic format conforms to predetermined linguistic rules specific to the generic format; then if the writing controller algorithm confirms that the machining preprogram in the generic format conforms to the predetermined linguistic rules specific to the generic format then this machining preprogram in the generic format is stored in memory so that it can be kept and a second writing algorithm rewrites this machining preprogram in the format executable by the said physical controller; then checking, by a reading controller algorithm, the machining preprogram in the format executable by the said physical controller, this reading controller algorithm checking whether this machining preprogram in the format executable by the said physical controller conforms to predetermined linguistic rules specific to the format executable by the said physical controller; then if the reading controller algorithm confirms that the machining preprogram in the format executable by the said physical controller conforms to the predetermined linguistic rules specific to the format executable by the said physical controller, then this machining preprogram in the format executable by the physical controller is considered to be the machining program generated in the format executable by the said physical controller, this latter program then being recorded so that it can be transmitted to the machine tool to be interpreted and executed by the physical controller thereof.

2. The method of generating a machining program according to claim 1, in which one of the machining feasibility tests is a test on the kinematic feasibility of the machining that involves checking, as a function of the prerecorded set of machine parameters and as a function of the prerecorded set of machining sequences, that the machine tool is capable of moving the actual tool in accordance with each of the machining sequences and in accordance with link paths, each link path being representative of an expected movement of the actual tool between two of the said machining sequences that immediately succeed one another.

3. The method of generating a machining program according to claim 2, in which the kinematic feasibility test involves:

generating, from the machining sequences and from the link paths, a simulated expected route of the tool throughout the machining;

calculating the relative movements of a set of space volumes comprising the space volumes representative of the machine tool, a space volume representative of the tool holder, a space volume representative of the actual tool borne by the tool holder, a space volume representative of the means of holding the actual workpiece in position, this calculation of the relative movements of all of the space volumes being carried out on the basis of the simulated expected route of the tool throughout the machining, of the kinematic links between the said moving parts of the machine and from an expected positioning of the means that hold the actual workpiece in position on the moving part of the machine bearing the means for holding the actual workpiece in position;

if, during the relative movements of all the space volumes, it is found that there are collisions between some of the space volumes of this set then it is considered that the kinematic feasibility test has not been passed, which means to say that it is considered that the kinematic feasibility test has been failed and the computer simulation program therefore prevents the generation of the machining program in the executable format; and if there is not found to be any collision between the space volumes of the set of space volumes then the kinematic feasibility test is considered to have been passed.

4. The method of generating a machining program according to claim 2, in which each link path linking two of the said machining sequences that immediately succeed one another is calculated by a link path calculating algorithm executed by a processor:

as a function of an expected first position of the actual tool at the end of the first of these two machining sequences that immediately succeed one another; and as a function of an expected second position of the tool at the start of the second of these two machining sequences that immediately succeed one another.

5. The method of generating a machining program according to claim 2, in which one of the machining feasibility tests is a test on the expected machining quality, involving:

a) determining a deviation between:

an expected model of the machined workpiece which is determined by carrying out a simulation of the removal of material from the workpiece by the tool moving along the simulated expected route of the tool throughout the machining; and a model of a component that is to be machined, which model is generated using computer aided design software; then b) if the deviation thus determined is greater than a predetermined authorized maximum deviation then a deviation analysis algorithm generates an alert that one of the machining feasibility tests, in this instance the expected machining quality test, has been failed, and if not, the deviation analysis algorithm generates a signal that this expected machining quality test has been passed.

6. The method of generating a machining program according to claim 1, in which one of the machining feasibility tests is a test of protecting the cutting tool and involving generating, from the machining sequences and from the link paths, a simulated expected route of the tool throughout the machining with respect to the workpiece and then in ensuring:

that the simulated expected route of the actual tool is such that the actual tool moving through the workpiece cannot move at a speed higher than a predetermined limit speed;

and/or that the actual tool moved along the simulated expected route is always moved in such a way as to machine the workpiece only using cutting edges; then if one of these conditions is failed, the computer simulation program prevents the generation of the machining program in the format executable by the said physical controller.

7. The method of generating a machining program according to claim 1, in which, on the basis of each expected movement of an actual tool during part of the machining of a component, extreme positions through which the actual tool needs to pass in order to perform the machining are calculated and one of the machining feasibility tests is a test on the physical feasibility of the machining that involves checking whether the machine tool is capable of moving the actual tool in such a way that it can achieve each of the calculated extreme positions.

8. The method of generating a machining program according to claim 1, in which an alert is generated if a machining feasibility test is failed.

9. The method of generating a machining program according to claim 8, in which the alert generated is associated with an alert message selected from a predetermined list of alert messages, the alert message selected indicating an assumed reason for the failure of the machining feasibility tests.

10. The method of generating a machining program according to claim 1, in which the prerecorded set of machining sequences comprises:

machining sequences expressed in the form of a numerical control machine tool program in G code; or machining sequences originating from computer aided manufacturing software; or machining sequences expressed in the form of machining tool paths; or a combination of G-code machining sequences, sequences originating from computer aided manufacturing software and sequences expressed in the form of machining tool paths.

\* \* \* \* \*